United States Patent [19]

Berkowitz

[11] 4,386,890
[45] Jun. 7, 1983

[54] DELIVERY VALVE ASSEMBLY, ESPECIALLY FOR ROTARY COMPRESSORS

[75] Inventor: Murray Berkowitz, Woodcliff Lake, N.J.

[73] Assignee: Curtiss-Wright Corporation, Wood-Ridge, N.J.

[21] Appl. No.: 230,636

[22] Filed: Feb. 2, 1981

[51] Int. Cl.³ .......................................... F04C 29/08
[52] U.S. Cl. .................. 418/61 A; 418/270; 137/512.1; 137/852
[58] Field of Search .............. 418/61 A, 270, 15; 137/512.1, 852

[56] References Cited

U.S. PATENT DOCUMENTS

| | | | |
|---|---|---|---|
| 3,448,727 | 6/1969 | Kobayakawa | 418/61 A |
| 3,623,504 | 11/1971 | Davis | 137/852 |
| 4,012,180 | 3/1977 | Berkowitz et al. | 418/141 |
| 4,088,428 | 5/1978 | Bannister et al. | 418/270 |
| 4,127,369 | 11/1978 | Eiermann et al. | 418/270 |
| 4,149,834 | 4/1979 | Eiermann | 418/270 |
| 4,199,309 | 4/1980 | Connor | 418/270 |

FOREIGN PATENT DOCUMENTS 2131237 1/1973 Fed. Rep. of Germany ... 418/61 A

Primary Examiner—Ira S. Lazarus
Assistant Examiner—Magdalen Moy
Attorney, Agent, or Firm—Stephen A. Roen; Arthur L. Frederick

[57] ABSTRACT

A delivery valve assembly, especially for a rotary mechanism, such as a compressor, disposed within a valve chamber of a peripheral wall of a housing, which includes a stop disposed within the chamber, a valve seat formed in an end-wall disposed across an outer end of the chamber, and a movable valve element having an open and closed position. The valve element is generally rectangularly shaped in cross-section and comprises a resilient plannar inner portion disposed against the valve seat when it is closed and against the stop when opened. Springs, in the form of a pair of strips are fixedly attached at one end to the peripheral wall and extend across the outer end of the chamber, are attached at their other ends to the inner portion via a pair of side portions. These side portions are resilient and are in substantially opposed relationship. In operation, the springs normally bias the inner portion against the valve seat to its closed position, but when the valve is opened, the inner portion is moved away from its seat until it is disposed against the stop permitting flow to enter and pass through the valve chamber.

9 Claims, 4 Drawing Figures

DELIVERY VALVE ASSEMBLY, ESPECIALLY FOR ROTARY COMPRESSORS

This invention relates to a delivery valve assembly for rotary compressors and expansion engines and, more specifically, to compressors and expansion engines of the type which have a rotor supported for planetary movement within a housing and wherein the rotor has a peripheral surface forming a profile of hypotrochoidal configuration and the housing inner surface that is substantially the outer envelope traced by the rotor upon relative rotary motion of the rotor. Such a compressor or expansion engine is disclosed in British Pat. No. 583,035 granted Dec. 5, 1946 to Maillard and the U.S. Pat. No. 4,012,180, dated Mar. 15, 1977, and is generally known as a Maillard-type compressor or engine.

Such delivery valve assemblies control the delivery of the medium from the compressor's working chamber. They are closed by the pressure of the compressed medium already delivered and they are only opened when the counter-pressure of the medium is attained or exceeded by the rising pressure in the working chamber.

These delivery valve assemblies should meet the following requirements, among others; the entire valve seat should be disposed as close as possible to the inner or peripheral surface of the housing so as to maintain lost volume or dead space at the inlet to the valve of the assembly as small as possible; the valve opening should extend over most of the width of the housing's peripheral surface; there should be the least possible weakening of the peripheral wall of the housing by the openings needed for the valve assemblies; and, the valve assembly should be easy to get at and to assemble.

These requirements are substantially achieved by U.S. Pat. No. 4,149,834, granted Apr. 17, 1979, wherein there is described a delivery valve assembly which is adapted to be inserted in an opening extending parallel to the axis of the peripheral housing of a compressor comprising three parts, a sleeve forming a valve seating with tangentially directed valve slots which is adapted to be fitted in a bore in the peripheral wall of a compressor, a first component of $\Omega$ shape over its entire length received within the sleeve, the closed side of the first component facing the valve slots and having a larger radius of curvature than the sleeve, the bentback flanges and the lateral flanks of the first component having in its flanks tangentially directed rectangular lateral openings in which are guided parallel strip-shaped portions of a second component comprising a resilient sheet metal plate of which the edges are located in the flanges of the $\Omega$ shaped component, the arrangement being such that in use the parallel strip-shaped portions engage the sleeve in front of the valve slots when the valve is closed. However, since the valve seat is arcuate rather than planar, the lost volume increases and as the diameter of the inlet port increases, the lost volume rapidly increases in a non-linear fashion. Additionally since three valve assembly components are necessary, all of which are arcuate, there is a high degree of dimensional accuracy or greater tolerances required in their manufacture in order to provide proper sealing. As a consequence of such tolerance requirements, their relatively complex shapes, and because they are a three component assembly, their manufacturing costs are relatively high.

Accordingly, it is a general object of this invention to provide an improved delivery valve assembly which substantially overcomes the disadvantages of known valve assemblies and which substantially achieves the above described requirements.

Another object of this invention is to provide a delivery valve assembly for a compressor which is relatively simple and inexpensive to manufacture.

A still further object of this invention is to provide a delivery valve assembly for a compressor which does not require a high degree of dimensional accuracy in its manufacture while still providing proper sealing.

An additional object of this invention is to provide a delivery valve assembly for a compressor which minimizes lost volume.

The foregoing and related objects are obtained in accordance with the invention which in its broader aspects provides a rotary mechanism such as a compressor, expansion engine or the like having a housing with axially spaced end walls and a peripheral wall interconnecting the end walls to form a cavity therebetween, the peripheral wall having at least one flow control means each of which comprises at least one passage means opening into the cavity, the passage means having a valve chamber which has an inner and outer end and an end portion which is disposed thereacross substantially flush with the surface of the engine cavity, the peripheral wall inner surface, and having an aperture therethrough constituting port means and a delivery valve assembly disposed within each valve chamber. The delivery means assembly comprises a stop means fixedly disposed within the valve chamber, a valve seat formed in the end portion, and a movable valve element having an open and closed position. The valve element includes a resilient planar inner portion which is disposed against the valve seat and covering the aperture when the valve element is in a closed position and which is disposed against the stop means when the valve element is in an open position. A spring means is connected to the inner portion to bias it against the valve seat.

In a narrower aspect of this invention, the valve element further includes a pair of resilient side portions, each having one end connected to the inner portion in substantially opposed relationship and having its other end connected to the spring means.

In a still narrower scope of this invention, these side portions have a reverse compound curvature when the valve element is open.

Other objects of the invention will become apparent upon reading the specification taken in connection with the accompanying drawings.

DESCRIPTION OF A PREFERRED EMBODIMENT

Figure 1:
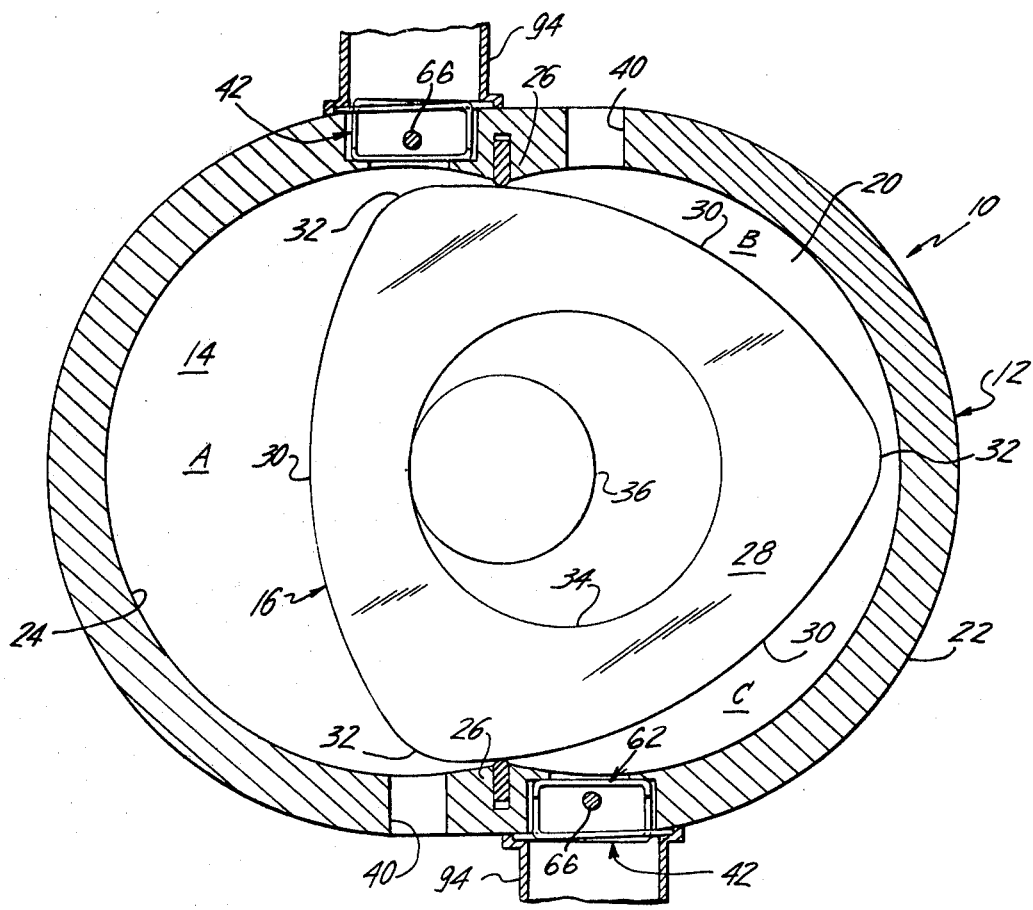
FIG. 1 is a simplified cross-sectional view of a rotary compressor with delivery valve assemblies according to the invention.

Now, referring to the drawings and more particularly to FIG. 1, the reference number 10 generally designates the rotary compressor of the Maillard type according to the present invention. The rotary compressor comprises a housing 12, having a chamber or cavity 14 of two lobes with a rotor 16 of generally triangular profile.

The housing 12 has two end walls 20 (only one of which is shown), abutting opposite ends of a peripheral wall 22, the walls being suitably secured together by means, such as by tie bolts and dowels (not shown), to form the multi-lobe housing cavity 14. The peripheral wall 22 has an inner surface 24 conforming substantially in shape to the trace of a hypotrochoidally generated outer envelope of the plural lobe type. As illustrated, the cavity is of the two-lobe type with junctures of the lobes located at 26.

The rotor 16 of the compressor 10 comprises a body portion having opposite, substantially parallel side faces 28 (only one of which is shown) and three peripheral surfaces or flanks 30. The three flanks converge at opposite ends to give the rotor the generally triangular profile. The area of convergence of the flanks 30 form apex or nose portions 32. The peripheral configuration of rotor 16 is a line substantially parallel to the inner envelope of a hypotrochoid. In the case of a rotary piston mechanism of the hypotrochoidal type, as shown in the Maillard British Pat. No. 583,035, granted Dec. 5, 1946, the apex or nose portions 32 have a relatively blunt-round configuration. The rotor 16 is supported for planetary rotative movement in cavity 14 by an eccentric portion 34 of a crankshaft 36 which, in turn, is supported in suitable bearings (not shown) in end walls 20. The rotor 16 is of a width which is substantially equal to the width of peripheral wall 22 so that side faces 28 are in close running-fit with the adjacent inner surfaces of end wall 20. The rotor defines with housing 12 a plurality working chambers A, B and C, each of which successively expand and contract in volumetric size as rotor 16 planetates within cavity 14 relative to housing 12.

The housing 12 of compressor 10 is provided with an intake port 40 and a pair of discharge port means or flow control means 42 on opposite sides of each of the junctures 26 so that gaseous fluid to be compressed passes into and compressed gaseous fluid is discharged from a working chamber associated with each lobe of cavity 14. In other words, for each complete rotation of crankshaft 36, there are two discharges of compressed gaseous fluid and for a compressor with a timing gear ratio of 3:2, the rotating speed of shaft 36 about its axis is equal to three times the rotating speed of rotor 16 about its axis so that for each revolution of the rotor there are six discharges of compressed air. Each of the discharge port means 42 includes a delivery valve assembly 44, described in detail infra, within each valve chamber. The delivery valve assembly 44 functions to prevent reexpansion of the compressed discharged fluid into the following working chamber and will allow passage of compressed fluid out of the working chamber only after a predetermined pressure differential value is achieved across its valve. While the inlet ports 40 are shown as peripheral ports, that is located in peripheral wall 22, it is contemplated by this invention that, alternatively, the inlet ports can be located in one or both of the end walls 20 without departure from the scope and spirit of this invention.

Figure 4:
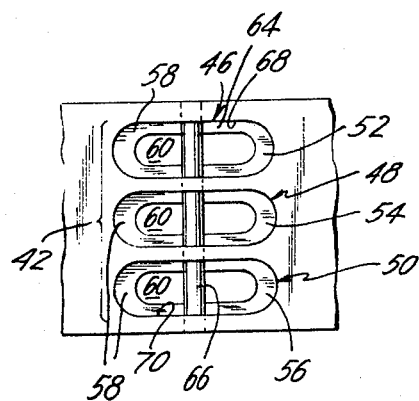
FIG. 4 is a simplified top view of a portion of the peripheral wall of the rotary compressor of FIG. 1 with the delivery duct and the three valve elements of their three passage means removed.
Figure 2:
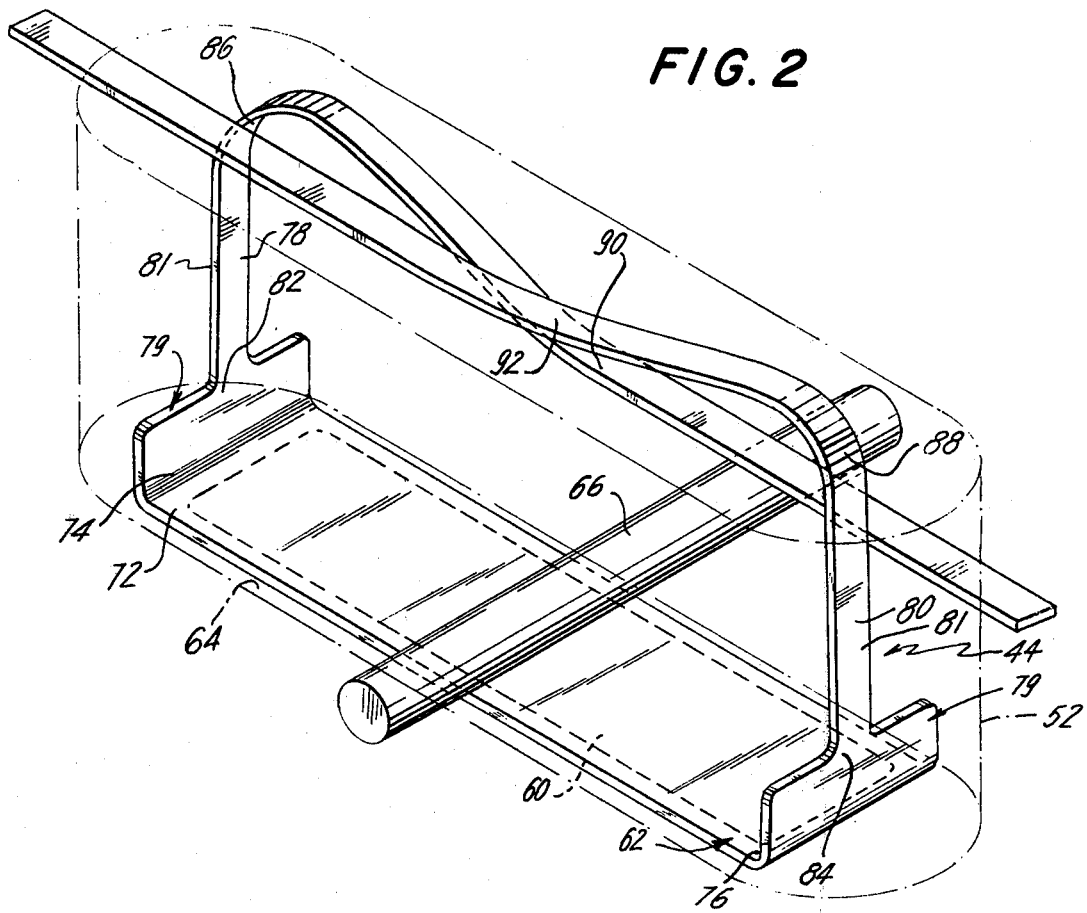
FIG. 2 is a perspective view of a single delivery valve assembly, disposed within its valve chamber which is shown in broken lines, according to the invention.
Figure 3:
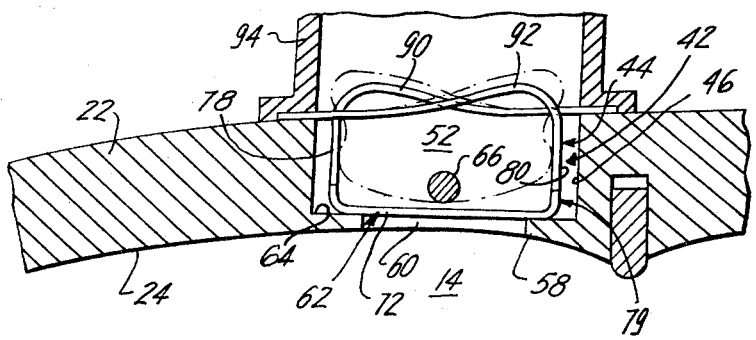
FIG. 3 is an enlarged, simplified, radial section through a portion of the rotary compressor of FIG. 1, showing a single delivery valve assembly; the valve is shown in its open position by the broken lines with the characteristic deformation exaggerated.

Now, referring particularly to the drawing of FIGS. 2-4, each of the pair of discharge means 42 includes three passage means 46, 48 and 50, each passage means opening into said cavity 14, and each of which has a valve chamber 52, 54 and 56, respectively, each valve chamber having an inner and outer end. Each valve chamber has an axis which is substantially normal to said inner surface 24 of peripheral wall 22. Within each of said valve chambers 52, 54, and 56, an end portion or end wall 58 is disposed across the inner end of said valve chamber and is substantially flush with the inner surface 24 of the engine cavity 14. Each end wall 58 has an aperture or slot 60 therethrough constituting a port means. Each valve chamber has a delivery valve assembly 44 disposed therein.

Each delivery valve assembly 44 includes a generally rectangularly shaped movable valve element 62, having an open and closed position, a planar valve seat 64 formed at the end wall 58 of its valve chamber, and a stop means 66 fixedly disposed within its valve chamber.

The stop means 66 comprises an elongated rod element which extends through the inner ends of the valve chambers of all three passage means 46, 48 and 50, and is fixedly mounted in side walls 68 and 70 of valve chambers 52 and 56, respectively, and above slots 60.

An inner end or inner portion 72 of movable valve element 62 is disposed against the planar valve seat 64 formed on the planar surface of a portion of the end wall 58 defining the inner end of the valve chamber 52. The movable valve element 62 comprises a generally rectangular, elongated, resilient planar inner portion 72, which when disposed against said valve seat 64 entirely covers slot 60. Said inner portion 72 has a first and second end, 74 and 76, respectively, to which are attached, at substantially right angles, resilient side portions 78 and 80, respectively, at their inner ends 82 and 84, respectively. Each side portion or member comprises an inner section 79, which is attached to one of the inner ends of the inner portion 72 and which has a width that is the same as the width of the inner portion 72, and an outer section 81 whose width is substantially less than its inner section 79. These side members 78 and 80 are disposed as close as possible to the valve chamber's side walls to permit bending thereof thereby allowing the valve to open as discussed infra and to permit the least circumferential length of chamber 52 for a given circumferential length of slot 60. This is facilitated by the bend at the first and second ends 74 and 76, respectively, and the full width of inner sections 79. These pair of side portions 78 and 80 are disposed parallel to each other as well as being in substantially opposed relationships. The outer sections 81 of the side portions 78 and 80 are connected at their outer ends 86 and 88, respectively, at substantially right angles, to spring means 90 and 92, respectively. These spring means 90 and 92, comprise a pair of resilient, rectangularly shaped, elongated, springs, which extend across the outer end of valve chamber 52 and are fixedly connected at their ends to the outer surface of peripheral wall 22 by a flange end of a common delivery or discharge duct 94. The discharge duct 94 also extends across the width of the peripheral wall 22 to allow the outer end of all the valve chambers to communicate with the passage of the duct. When the valve is closed, the force of the springs 90 and 92 combined with the excess pressure in the valve chambers 52, 54 and 56, press against the inner portion 72 of the valve element 62 and thereby close the latter against the valve seat 64 as shown in FIG. 2.

As a result of excess pressure in any one of the working chambers of the compressor 10 which exceeds the force of the springs 90 and 92 and the pressure in the valve chambers, the inner end 72 of each valve 62 is lifted away from its valve seat 64 and its discharge port means 60 and thereby opens the latter, as shown in FIG. 3 by the broken lines which show the position of the valve 62 when it is in the open position. A small part of the inner portion 72, at its middle, is shown engaged or pressed against the rod stop means 66, which rod is substantially equidistant from the ends 74 and 76 of said inner portion 72; the side portions 78 and 80 also bend, into a reverse compound curvature, as do the springs 90 and 92 which bend upwards at their free ends and in a direction away from the discharge port means 60. When the valve 62 is open as described, the gas under pressure from the working chamber enters the valve chambers 52 through their slots 60 so as to be conducted away through the delivery duct 94.

It should be understood that this invention is not limited to the specific details of construction and arrangement thereof herein illustrated and that changes and modifications may occur to one skilled in the art without departing from the scope of the invention.

What is claimed is:

1. In a rotary mechanism such as a compressor, expansion engine or the like having a housing with axially spaced end walls and a peripheral wall interconnecting the end walls to form a cavity therebetween, said peripheral wall having at least one flow control means comprising at least one passage means, opening into said cavity, said passage means having a valve chamber having an inner and outer end and an end portion disposed thereacross substantially flush with the surface of said engine cavity and having an aperture therethrough constituting port means and a delivery valve assembly, disposed within said valve chamber, comprising:

a stop means fixedly disposed within said valve chamber;
    a valve seat formed in said end portion; and
    a movable valve element having an open and closed position including,
        a resilient planar portion disposed against said valve seat and covering said aperture when said valve element is in a closed position and disposed against said stop means when said valve element is in an open position, and
    resilient side portions integral with and of smaller width than the width of the planar portion;
    each of said side portions extending away from the opposite ends of the planar portion and so formed as to have part thereof overlying in spaced relation the plane of the planar portion; and
    holding means for securing the distal end portions of each of said side portions against movement relative to said peripheral wall so that the side portions exert a biasing force on the planar portion in a direction urging the latter into the closed position.

2. The device, according to claim 1, wherein said end portion forms a planar valve seat.

3. The device, according to claim 1, wherein said distal end portions of said side portions are connected at substantially rights angles to said planar portion direction of movement.

4. The device, according to claim 1, wherein said stop means is disposed within said valve chamber at a point which is substantially equidistant from the ends of the planar portion.

5. The device, according to claim 1, wherein said stop means is adapted to engage only a small part of said planar portion when said valve element is in an open position.

6. The device of claim 1 wherein the distal end portions of the side portions project beyond the ends of the planar portion.

7. The device of claim 1 wherein said side portions are laterally offset from each other.

8. The device of claim 7 wherein said side portions parts which overlie the planar portions are disposed in side-by-side relationship to each other.

9. The device of claim 1 wherein said flow control means comprises a plurality of spaced passage means and wherein said stop means is an elongated element extending through each of the valve chambers.

* * * * *